(12) United States Patent
Kumatani et al.

(10) Patent No.: US 9,868,087 B2
(45) Date of Patent: Jan. 16, 2018

(54) CORE-SHELL OXIDE MATERIAL, METHOD FOR PRODUCING THE SAME, AND CATALYST AND METHOD FOR PURIFICATION OF EXHAUST GAS USING THE CORE-SHELL OXIDE MATERIAL

(71) Applicant: TOYOTA JIDOSHA KABUSHIKI KAISHA, Toyota-shi, Aichi (JP)

(72) Inventors: Naoki Kumatani, Nagakute (JP);
Toshitaka Tanabe, Nagakute (JP);
Akira Morikawa, Nagakute (JP);
Masahide Miura, Toyota (JP);
Hiromasa Suzuki, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/468,956

(22) Filed: Mar. 24, 2017

(65) Prior Publication Data

US 2017/0282123 A1 Oct. 5, 2017

(30) Foreign Application Priority Data

Mar. 31, 2016 (JP) .................. 2016-071347
Feb. 1, 2017 (JP) .................. 2017-016582

(51) Int. Cl.
| | | |
|---|---|---|
| B01D 53/94 | (2006.01) | |
| B01J 21/04 | (2006.01) | |
| B01J 21/06 | (2006.01) | |
| B01J 23/10 | (2006.01) | |
| B01J 23/63 | (2006.01) | |
| B01J 35/00 | (2006.01) | |

(Continued)

(52) U.S. Cl.
CPC .......... *B01D 53/9413* (2013.01); *B01J 21/12* (2013.01); *B01J 23/10* (2013.01); *B01J 35/0006* (2013.01); *B01J 37/0009* (2013.01); *B01J 37/0215* (2013.01); *B01J 37/08* (2013.01); *B01D 2255/1021* (2013.01); *B01D 2255/1023* (2013.01); *B01D 2255/1025* (2013.01); *B01D 2255/908* (2013.01); *B01D 2255/9202* (2013.01); *B01D 2255/9207* (2013.01)

(58) Field of Classification Search
CPC . B01J 21/04; B01J 21/066; B01J 23/10; B01J 23/63; B01J 35/0006; B01J 37/0009; B01J 37/0215; B01J 37/08; B01D 53/9413

See application file for complete search history.

(56) References Cited

U.S. PATENT DOCUMENTS

| | | | | |
|---|---|---|---|---|
| 6,387,338 B1 * | 5/2002 | Anatoly | ............. | B01D 53/8628 423/239.1 |
| 7,101,819 B2 * | 9/2006 | Rosenflanz | ............. | C03B 19/06 428/426 |

(Continued)

FOREIGN PATENT DOCUMENTS

| | | |
|---|---|---|
| JP | 2005-000830 A | 1/2005 |
| JP | 2007-069107 A | 3/2007 |

(Continued)

*Primary Examiner* — Cam N. Nguyen
(74) *Attorney, Agent, or Firm* — Sughrue Mion, PLLC (57) ABSTRACT

A core-shell oxide material comprises: a core which comprises a ceria-zirconia based solid solution powder having at least one ordered phase of a pyrochlore phase and a κ phase; and a shell which comprises an alumina based oxide disposed on at least a portion of a surface of the core.

8 Claims, 1 Drawing Sheet

(51) Int. Cl.
    *B01J 37/00*     (2006.01)
    *B01J 37/02*     (2006.01)
    *B01J 37/08*     (2006.01)
    *B01J 21/12*     (2006.01)

(56) References Cited

U.S. PATENT DOCUMENTS

| | | | | |
|---|---|---|---|---|
| 7,214,643 B2* | 5/2007 | Yamamoto | ............ | C01G 25/00 |
| | | | | 423/592.1 |
| 7,632,776 B2* | 12/2009 | Miura | ................ | B01D 53/945 |
| | | | | 502/304 |
| 7,871,956 B2* | 1/2011 | Wakita | ................ | B01D 53/945 |
| | | | | 423/593.1 |
| 7,968,490 B2* | 6/2011 | Takeshima | ........... | B01J 35/0013 |
| | | | | 423/594.12 |
| 8,026,193 B2* | 9/2011 | Miura | ................ | B01J 23/10 |
| | | | | 502/304 |
| 8,048,389 B2* | 11/2011 | Okamoto | ............ | B01D 53/945 |
| | | | | 423/21.1 |
| 8,097,553 B2* | 1/2012 | Miura | ................ | B01D 53/945 |
| | | | | 423/263 |
| 8,187,548 B2* | 5/2012 | Yamada | ............... | B01D 53/944 |
| | | | | 422/177 |
| 8,187,995 B2* | 5/2012 | Wakita | ................ | B01D 53/945 |
| | | | | 423/593.1 |
| 8,293,677 B2* | 10/2012 | Miura | ................ | B01D 53/945 |
| | | | | 423/213.2 |
| 8,697,600 B2* | 4/2014 | Nobukawa | ........... | B01D 53/945 |
| | | | | 502/302 |
| 8,765,631 B2* | 7/2014 | Yagishita | ............. | B01D 53/944 |
| | | | | 502/304 |
| 8,853,120 B2* | 10/2014 | Aoki | ................... | B01D 53/945 |
| | | | | 502/302 |
| 9,308,516 B2* | 4/2016 | Houshito | ................. | B01J 23/63 |
| 9,376,327 B2* | 6/2016 | Morikawa | ................ | B01J 35/04 |
| 9,387,461 B2* | 7/2016 | Wu | ........................ | B01D 53/945 |
| 9,533,290 B2* | 1/2017 | Nagao | ...................... | B01J 23/34 |
| 9,579,633 B2* | 2/2017 | Suzuki | ............... | B01D 53/9468 |
| 9,597,666 B2* | 3/2017 | Wu | ........................ | B01D 53/945 |
| 9,669,389 B2* | 6/2017 | Nakahara | ................. | B01J 23/10 |
| 9,707,543 B2* | 7/2017 | Asanuma | ................. | B01J 23/63 |
| 9,751,075 B2* | 9/2017 | Nagao | ...................... | B01J 23/10 |
| 2007/0197373 A1* | 8/2007 | Miura | ................... | B01J 37/0009 |
| | | | | 502/100 |
| 2011/0207601 A1* | 8/2011 | Matsueda | ........... | B01D 53/945 |
| | | | | 502/303 |
| 2012/0027653 A1* | 2/2012 | Da Costa | ........... | B01D 53/8628 |
| | | | | 423/210 |
| 2012/0309616 A1* | 12/2012 | Yagishita | ............. | B01D 53/944 |
| | | | | 502/304 |
| 2013/0143732 A1* | 6/2013 | Aoki | .................. | B01D 53/9445 |
| | | | | 502/304 |
| 2014/0309104 A1* | 10/2014 | Murota | .................. | C01G 25/00 |
| | | | | 502/303 |
| 2015/0273437 A1 | 10/2015 | Miura et al. | | |
| 2016/0121302 A1* | 5/2016 | Morikawa | ................ | B01J 23/10 |
| | | | | 502/303 |
| 2016/0184801 A1* | 6/2016 | Morikawa | ............. | B01D 53/94 |
| | | | | 502/304 |
| 2016/0296910 A1* | 10/2016 | Wu | ......................... | B01J 23/10 |

FOREIGN PATENT DOCUMENTS

JP     2007-144290 A    6/2007
JP     2014-114180 A    6/2014

* cited by examiner

CORE-SHELL OXIDE MATERIAL, METHOD
FOR PRODUCING THE SAME, AND
CATALYST AND METHOD FOR
PURIFICATION OF EXHAUST GAS USING
THE CORE-SHELL OXIDE MATERIAL

BACKGROUND OF THE INVENTION

Field of the Invention

The present invention relates to a core-shell oxide material comprising a ceria-zirconia based composite oxide whose surface is coated with an alumina based oxide, a method for producing the core-shell oxide material, and a catalyst and a method for purification of exhaust gas using the core-shell oxide material.

Related Background Art

Conventionally, composite oxides containing various metal oxides have been utilized as a support, a co-catalyst, and the like for a catalyst for purification of exhaust gas. As a metal oxide in such a composite oxide, ceria is favorably used because ceria is capable of storing and releasing oxygen according to the oxygen partial pressure in the atmosphere (i.e., ceria has an oxygen storage/release capacity). In addition, recently, various types of composite oxides containing ceria have been studied, and various ceria-zirconia based composite oxides and methods for producing the ceria-zirconia based composite oxides have been disclosed.

For example, Japanese Unexamined Patent Application Publication No. 2007-144290 (Patent Literature 1) discloses a catalyst for purification of exhaust gas comprising: a support having a core-shell structure in which a particle of an oxygen storage/release material such as ceria forms a core portion and a supporting oxide such as zirconia or titania forms a shell portion; and noble metal particles comprising at least rhodium particles in contact with the support. Patent Literature 1 states that the rhodium oxidation is suppressed, and also that the oxygen storage/release capacity improves the catalytic activity.

Moreover, Japanese Unexamined Patent Application Publication No. 2005-830 (Patent Literature 2) discloses a catalyst for purification of exhaust gas comprising: a composite particle of a $CeO_2$—$ZrO_2$ solid solution particle and an $Al_2O_3$ layer covering at least a part of the $CeO_2$—$ZrO_2$ solid solution particle surface; and Pt and Pd supported on at least the $Al_2O_3$ layer. Patent Literature 2 states that the grain growth of the noble metals is suppressed, and also that the oxygen storage/release capacity is improved.

Further, Japanese Unexamined Patent Application Publication No. 2007-69107 (Patent Literature 3) discloses a catalyst for purification of exhaust gas comprising: an alumina support; particles of a noble metal such as Pt, Pd, or Rh existing inside the alumina support; and co-catalyst particles of ceria, zirconia, or the like in contact with the noble metal particles. Patent Literature 3 also states that the aggregation of the noble metal particles is suppressed by the anchoring effect, so that, even if the air-fuel ratio varies, the catalyst can maintain high catalytic activity and be prevented from decreasing in the purification performance.

Further, Japanese Unexamined Patent Application Publication No. 2014-114180 (Patent Literature 4) discloses a composite oxide material comprising: crystalline particles of a ceria-zirconia composite oxide having a pyrochlore structure; and lanthana-zirconia composite oxide crystals having a pyrochlore structure and existing on surfaces of the crystalline particles, wherein the lanthana-zirconia composite oxide crystals are at least partly solid-dissolved in the surfaces of the crystalline particles of the ceria-zirconia composite oxide. Patent Literature 4 states that the oxygen storage capacity is less likely to decrease even at high temperatures.

SUMMARY OF THE INVENTION

However, since zirconia and titania are relatively dense oxides, the catalyst for purification of exhaust gas described in Patent Literature 1 has a problem that oxygen has low diffusion property in the shell portion, resulting in a slow oxygen storage/release rate. Moreover, when this catalyst for purification of exhaust gas is exposed to high temperatures, ceria in the core portion and zirconia in the shell portion diffuse into each other, so that the core-shell structure deteriorates. This brings about a problem that the catalytic activity of rhodium is decreased.

Moreover, in the catalysts for purification of exhaust gas described in Patent Literatures 2 and 3, since the oxygen utilization efficiency of ceria in the $CeO_2$—$ZrO_2$ solid solution particle and the $CeO_2$—$ZrO_2$ co-catalyst particle is low, a sufficiently high oxygen storage/release capacity is not always obtained.

Further, the present inventors have found that, when a catalyst comprising rhodium on the composite oxide material described in Patent Literature 4 is exposed to high temperatures, the catalyst can exhibit an excellent oxygen storage/release capacity, but has a problem of decrease in the NOx purification performance.

The present invention has been made in view of the above-described problems of the conventional technologies. An object of the present invention is to provide an oxide material which enables a catalyst for purification of exhaust gas to have an excellent oxygen storage/release capacity (particularly, oxygen storage/release rate) and exhibit an excellent NOx purification performance even when the catalyst is exposed to high temperatures; a method for producing the oxide material; and a catalyst and a method for purification of exhaust gas using the oxide material.

The present inventors have conducted intensive study to achieve the above-described object and consequently found the following facts. Specifically, at least a portion of a surface of a core which comprises a ceria-zirconia based solid solution powder having at least one ordered phase of a pyrochlore phase and a κ phase is coated with an alumina based oxide to obtain a core-shell oxide material. A catalyst in which a noble metal is in contact with the core-shell oxide material has an excellent oxygen storage capacity and exhibits an excellent NOx purification performance even when the catalyst is exposed to high temperatures. This finding has led to the completion of the present invention.

Specifically, a core-shell oxide material of the present invention comprises:

a core which comprises a ceria-zirconia based solid solution powder having at least one ordered phase of a pyrochlore phase and a κ phase; and a shell which comprises an alumina based oxide disposed on at least a portion of a surface of the core.

In such a core-shell oxide material of the present invention, an intensity ratio of a diffraction line at 2θ=14.5° to a diffraction line at 2θ=29° [I(14/29) value] is preferably 0.02 or more, which is calculated from an X-ray diffraction pattern obtained by an X-ray diffraction measurement using CuKα after the core-shell oxide material is heated in air 1100° C. for 5 hours. Moreover, the core preferably further comprises a rare earth element other than Ce. Further, the shell preferably further comprises a rare earth element. Furthermore, the amount of the alumina based oxide coating is preferably 0.1 to 6 parts by mass relative to 100 parts by mass of the core.

A method for producing a core-shell oxide material of the present invention comprises the steps of:

subjecting a compact obtained by compression-molding a ceria-zirconia based solid solution to a reduction treatment at a temperature of 1500° C. or higher to obtain a ceria-zirconia based solid solution powder having at least one ordered phase of a pyrochlore phase and a κ phase;

bringing an alumina precursor into contact with the ceria-zirconia based solid solution powder having the ordered phase to make the alumina precursor adhere to at least a portion of a surface of the ceria-zirconia based solid solution powder having the ordered phase; and heating the ceria-zirconia based solid solution powder with the alumina precursor adhering thereto to obtain the core-shell oxide material of the present invention.

Moreover, a catalyst for purification of exhaust gas of the present invention comprises:

such a core-shell oxide material of the present invention; and a noble metal in contact with the core-shell oxide material. Further, a method for purification of exhaust gas of the present invention comprises bringing exhaust gas containing nitrogen oxide into contact with such a catalyst for purification of exhaust gas of the present invention.

Note that, in the present invention, intensity ratios [I(14/29) value] and [I(28/29) value] of diffraction lines are respectively an intensity ratio of a diffraction line at $2\theta=14.5°$ to a diffraction line at $2\theta=29°$ [I(14/29) value] and an intensity ratio of a diffraction line at $2\theta=28.5°$ to the diffraction line at $2\theta=29°$ [I(28/29) value], which are calculated from an X-ray diffraction pattern obtained by an X-ray diffraction measurement using CuKα after a core-shell oxide material serving as a measurement target is heated in air at 1100° C. for 5 hours. As the method of the X-ray diffraction measurement, adopted is a method in which the measurement is performed with an X-ray diffraction apparatus (for example, "RINT-2100" manufactured by Rigaku Corporation) using CuKα radiation as an X-ray source under conditions of 40 KV, 30 mA, and $2\theta=2°$/minute.

Here, the diffraction line at $2\theta=14.5°$ is a diffraction line derived from the (111) plane of the ordered phase (κ phase). The diffraction line at $2\theta=29°$ is a diffraction line in which a diffraction line derived from the (222) plane of the ordered phase and a diffraction line derived from the (111) plane of a cubic crystal phase of the ceria-zirconia solid solution (CZ solid solution) overlap. Thus, calculating the I(14/29) value that is the intensity ratio between the two diffraction lines provides an indicator which represents the percentage (remaining percentage) of the ordered phase maintained. Note that when the intensity of a diffraction line is calculated, an average intensity of diffraction lines at $2\theta=10°$ to $12°$ which is a background value is subtracted from a value of each diffraction line intensity for the calculation. In addition, a perfect ordered phase is a κ phase ($Ce_2Zr_2O_8$) which is completely filled with oxygen or a pyrochlore phase ($Ce_2Zr_2O_7$) from which oxygen is completely removed. The I(14/29) value of the κ phase and the I(14/29) value of the pyrochlore phase are respectively 0.04 and 0.05, which are calculated from the corresponding PDF cards (PDF2: 01-070-4048 for the κ phase, PDF2: 01-075-2694 for the pyrochlore phase). Further, the ordered phase, that is, a crystal phase having an orderly arranged structure formed of cerium ions and zirconium ions, has an arrangement structure (φ' phase-type orderly arranged phase (the φ' phase is the same phase as the κ phase): a superlattice structure that occurs in a fluorite structure) of a crystal which has peaks at 2θ-angle positions of 14.5°, 28°, 37°, 44.5°, and 51° in an X-ray diffraction pattern obtained by an X-ray diffraction measurement using CuKα. Note that the "peak" herein refers to one having a height of 30 cps or more, the height being from a baseline to a peak top.

Moreover, the diffraction line at $2\theta=28.5°$ is a diffraction line derived from the (111) plane of $CeO_2$ as a single component. Calculating the I(28/29) value that is the intensity ratio between the diffraction line at $2\theta=28.5°$ and the diffraction line at $2\theta=29°$ provides an indicator which represents the degree of phase separation of $CeO_2$ from a composite oxide.

Note that although it is not exactly clear why the core-shell oxide material of the present invention has an excellent oxygen storage/release capacity even when the core-shell oxide material is exposed to high temperatures, the present inventors speculate as follows. Specifically, the core in the core-shell oxide material of the present invention comprises a ceria-zirconia based solid solution powder having at least one ordered phase of a pyrochlore phase and a κ phase. The pyrochlore phase ($Ce_2Zr_2O_7$) of such a ceria-zirconia based solid solution shifts to the κ phase ($Ce_2Zr_2O_8$) according to the oxygen partial pressure in a gas phase, thereby exhibiting an oxygen storage/release capacity (OSC). In comparison with the oxygen storage/release capacity (OSC) exhibited in a fluorite phase, the oxygen storage/release capacity (OSC) exhibited as a result of such a phase shift between the pyrochlore phase and the κ phase has an oxygen utilization efficiency of $CeO_2$ which is quite high and reaches almost the theoretical limit, so that the ceria-zirconia based solid solution powder having the ordered phase exhibits quite high oxygen storage and $O_2$ bulk diffusion rate. Thus, the present inventors speculate that even when at least a portion of a surface of the core which comprises the ceria-zirconia based solid solution powder having the ordered phase is coated with an alumina based oxide, decreases in the oxygen storage and oxygen storage/release rate attributable to the coating are small, and that an excellent oxygen storage/release capacity is exhibited. Additionally, the core-shell oxide material of the present invention is subjected to the reduction treatment at a high temperature of 1500° C. or higher. Thus, the present inventors speculate that the core-shell oxide material of the present invention is excellent in high temperature stability in comparison with normal ceria-zirconia solid solutions, and that an excellent oxygen storage/release capacity is exhibited even when the core-shell oxide material of the present invention is exposed to high temperatures.

In addition, although it is not exactly clear why a catalyst comprising a noble metal in contact with the core-shell oxide material of the present invention exhibits an excellent NOx purification performance even when the catalyst is exposed to high temperatures, the present inventors speculate as follows. Specifically, in the catalyst comprising a noble metal in contact with the core-shell oxide material of the present invention, the noble metal is in contact with the shell of the core-shell oxide material, that is, the alumina based oxide as a cover layer. Thus, the present inventors speculate that this contact improves the reducibility of the noble metal (particularly, rhodium), and improves the NOx purification activity in comparison with a case where the noble metal is in contact with the core which comprises the ceria-zirconia based solid solution powder having the ordered phase. Further, even when the catalyst is exposed to high temperatures, the grain growth of the noble metal is suppressed and a decrease in the NOx purification activity is suppressed. The present inventors speculate that this is also one of reasons that the excellent NOx purification performance is exhibited.

The present invention makes it possible to obtain a catalyst for purification of exhaust gas which has an excellent oxygen storage/release capacity (OSC) (particularly, oxygen storage/release rate (OSC-r)) and exhibits an excellent NOx purification performance even when the catalyst is exposed to high temperatures.

DETAILED DESCRIPTION OF THE PREFERRED EMBODIMENTS

Hereinafter, the present invention will be described in detail based on preferred embodiments thereof.

First, a core-shell oxide material of the present invention will be described. The core-shell oxide material of the present invention comprises:

a core which comprises a ceria-zirconia based solid solution powder having at least one ordered phase of a pyrochlore phase and a κ phase; and a shell which comprises an alumina based oxide disposed on at least a portion of a surface of the core. Such a core-shell oxide material of the present invention has an excellent oxygen storage/release capacity (OSC) (particularly, oxygen storage/release rate (OSC-r)) even when the core-shell oxide material is exposed to high temperatures.

The core-shell oxide material of the present invention comprises a core which comprises a ceria-zirconia based solid solution powder having at least one ordered phase of a pyrochlore phase and a κ phase in each of which Ce and Zr are orderly arranged. Such a core-shell oxide material comprising the core which comprises the ceria-zirconia based solid solution powder having the ordered phase exhibits a higher oxygen diffusion rate in a bulk than that of a ceria-zirconia based solid solution having a fluorite structure. Thus, the core-shell oxide material is excellent in an oxygen storage/release capacity (OSC) (particularly, oxygen storage/release rate (OSC-r)). In addition, in such a ceria-zirconia based solid solution powder having the ordered phase, the content ratio between Ce and Zr is preferably 35:65 to 65:35, and more preferably 45:55 to 55:45 in terms of moles (Ce:Zr). If the molar ratio (Ce:Zr) is outside the range, when the ceria-zirconia based solid solution powder is exposed to high temperatures, the ordered phase is rearranged and changed to the fluorite structure, so that the oxygen storage/release capacity tends to decrease.

The core which comprises such a ceria-zirconia based solid solution powder having the ordered phase may further comprise an additional element such as Ti and a rare earth element other than Ce. Incorporating such an additional element suppresses the decrease in the oxygen storage/release capacity in the event of high temperature exposures. Moreover, examples of the additional element include Sc, Y, La, Pr, Nd, Sm, Gd, Tb, Dy, Yb, Lu, Ti, and the like. Especially, from the viewpoint of further suppressing the decrease in the oxygen storage/release capacity in the event of high temperature exposures, Y, La, Pr, and Nd are preferable, and Pr is more preferable. Note that one of these additional elements may be incorporated alone, or two or more thereof may be incorporated. Meanwhile, the additional element is normally incorporated in the form of oxide in the core. Further, the additional element is preferably present in such a state that the additional element is, for example, solid-dissolved or dispersed in the ceria-zirconia based solid solution powder having the ordered phase. More preferably, the additional element is solid-dissolved to surely obtain the effect of the additional element.

In the core according to the present invention, the content of the additional element in terms of the element is preferably 20% by mol or less, more preferably 10% by mol or less, and particularly preferably 5% by mol or less. If the content of the additional element exceeds the upper limit, the heat resistance of the ordered phase decreases, and the oxygen storage/release capacity tends to decrease in the event of high temperature exposures. Note that the lower limit of the content of the additional element is not particularly limited, but is preferably 0.1% by mol or more to surely obtain the effect of the additional element.

The average secondary particle diameter (average aggregate particle diameter) of the ceria-zirconia based solid solution powder having the ordered phase which forms the core according to the present invention is not particularly limited, but is preferably 100 nm to 100 μm, and more preferably 100 nm to 10 μm. The average secondary particle diameter of the ceria-zirconia based solid solution powder can be measured, for example, by dynamic light scattering without limitation thereto.

Further, the specific surface area of the ceria-zirconia based solid solution powder having the ordered phase is not particularly limited, but is preferably 0.1 to 20 $m^2/g$, and more preferably 0.5 to 10 $m^2/g$. If the specific surface area is less than the lower limit, the oxygen storage/release capacity tends to decrease. Meanwhile, if the specific surface area exceeds the upper limit, the number of particles having small particle diameters increases, and the high temperature durability tends to decrease. Note that such a specific surface area can be calculated as a BET specific surface area from an adsorption isotherm using the BET adsorption isotherm equation.

The core-shell oxide material of the present invention comprises: such a core which comprises a ceria-zirconia based solid solution powder having the ordered phase; and a shell which comprises an alumina based oxide disposed on at least a portion of a surface of the core. In such a core-shell oxide material, the amount of the alumina based oxide coating is preferably 0.1 to 6 parts by mass, and more preferably 0.2 to 1.5 parts by mass, relative to 100 parts by mass of the core. If the amount of the alumina based oxide coating is less than the lower limit, in a catalyst comprising a noble metal in contact with the core-shell oxide material, the reduction of the noble metal hardly proceeds due to the interaction between the noble metal and ceria in the core, and the NOx purification performance tends to decrease. Meanwhile, if the amount of coating exceeds the upper limit, the alumina based oxide aggregates and inhibits the diffusion of oxygen, so that the oxygen storage/release capacity tends to decrease.

The shell which comprises such an alumina based oxide may further comprise a rare earth element (preferably, a rare earth element other than Ce). Incorporating such a rare earth element in the shell improves the high temperature durability of the shell. Moreover, examples of the rare earth element include Sc, Y, La, Pr, Nd, Sm, Gd, Tb, Dy, Yb, Lu, and the like. Especially, from the viewpoint of further improving the high temperature durability of the shell, La is preferable. Note that one of these rare earth elements may be incorporated alone, or two or more thereof may be incorporated. Meanwhile, the rare earth element is normally incorporated in the form of oxide in the shell.

In the shell according to the present invention, the content of the rare earth element in terms of the element is preferably 10% by mol or less, more preferably 5% by mol or less, and particularly preferably 2% by mol or less. If the content of the rare earth element exceeds the upper limit, an aluminate phase is formed, decreasing the specific surface area of the shell, for example, so that the high temperature durability tends to decrease. Note that the lower limit of the content of the rare earth element is not particularly limited, but is preferably 0.1% by mol or more to surely obtain the effect of the rare earth element.

The thickness of such a shell is preferably 1 to 100 nm, and more preferably 2 to 50 nm. If the thickness of the shell is less than the lower limit, in a catalyst comprising a noble metal in contact with the core-shell oxide material, the reduction of the noble metal hardly proceeds due to the interaction between the noble metal and ceria in the core, and the NOx purification performance tends to decrease. Meanwhile, if the thickness exceeds the upper limit, the shell inhibits the diffusion of oxygen, so that the oxygen storage/release capacity tends to decrease.

In the core-shell oxide material of the present invention, the above-described I(14/29) value is preferably 0.02 or more, more preferably 0.030 or more, and particularly preferably 0.033 or more. If the I(14/29) value is less than the lower limit, the percentage of the ordered phase maintained is low, and the oxygen storage/release capacity tends to decrease in the event of high temperature exposures. Note that the upper limit of the I(14/29) value is not particularly limited, but is preferably 0.05 or less because the I(14/29) value of the pyrochlore phase calculated from the PDF card (01-075-2694) is the upper limit.

Moreover, in the core-shell oxide material of the present invention, the above-described I(28/29) value is preferably 0.08 or less, more preferably 0.06 or less, and particularly preferably 0.04 or less. If the I(28/29) value exceeds the upper limit, the oxygen storage/release capacity tends to decrease in the event of high temperature exposures. Note that the lower limit of the I(28/29) value is not particularly limited, but is preferably a smaller value.

Further, the specific surface area of the core-shell oxide material of the present invention is not particularly limited, but is preferably 0.1 to 20 $m^2/g$, and more preferably 0.5 to 10 $m^2/g$. If the specific surface area is less than the lower limit, the oxygen storage/release capacity tends to decrease. Meanwhile, if the specific surface area exceeds the upper limit, the number of particles having small particle diameters increases, and the high temperature durability tends to decrease. Note that such a specific surface area can be calculated as a BET specific surface area from an adsorption isotherm using the BET adsorption isotherm equation.

Next, a method for producing a core-shell oxide material of the present invention will be described. The method for producing a core-shell oxide material of the present invention comprises the steps of:

subjecting a compact obtained by compression-molding a ceria-zirconia based solid solution to a reduction treatment at a temperature of 1500° C. or higher to obtain a ceria-zirconia based solid solution powder having at least one ordered phase of a pyrochlore phase and a κ phase (reduction treatment step);

bringing an alumina precursor into contact with the ceria-zirconia based solid solution powder having the ordered phase to make the alumina precursor adhere to at least a portion of a surface of the ceria-zirconia based solid solution powder having the ordered phase (adhesion step); and heating the ceria-zirconia based solid solution powder with the alumina precursor adhering thereto (calcination step).

The ceria-zirconia based solid solution used in the method for producing a core-shell oxide material of the present invention has a content ratio between Ce and Zr of preferably 35:65 to 65:35, and more preferably 45:55 to 55:45 in terms of moles (Ce:Zr). If a ceria-zirconia based solid solution with the molar ratio (Ce:Zr) outside the range is used, when a core-shell oxide material to be obtained is exposed to high temperatures, the ordered phase is rearranged and changed to the fluorite structure, so that the oxygen storage/release capacity tends to decrease.

The ceria-zirconia based solid solution may further comprise an additional element such as Ti and a rare earth element other than Ce. Incorporating such an additional element suppresses the decrease in the oxygen storage/release capacity which may otherwise occur when a core-shell oxide material to be obtained is exposed to high temperatures. Moreover, examples of such an additional element include the exemplified additional elements which the core of the core-shell oxide material may comprise. Especially, from the viewpoint of further suppressing the decrease in the oxygen storage/release capacity which may otherwise occur when a core-shell oxide material to be obtained is exposed to high temperatures, Y, La, Pr, and Nd are preferable, and Pr is more preferable. Note that one of these additional elements may be incorporated alone, or two or more thereof may be incorporated. Meanwhile, the additional element is normally incorporated in the form of oxide in the core. Further, the additional element is preferably present in such a state that the additional element is, for example, solid-dissolved or dispersed in the ceria-zirconia based solid solution. More preferably, the additional element is solid-dissolved to surely obtain the effect of the additional element.

In the ceria-zirconia based solid solution, the content of the additional element in terms of the element is preferably 20% by mol or less, more preferably 10% by mol or less, and particularly preferably 5% by mol or less. If the content of the additional element exceeds the upper limit, the heat resistance of the ordered phase decreases, and the oxygen storage/release capacity tends to decrease in the event of high temperature exposures. Note that the lower limit of the content of the additional element is not particularly limited, but is preferably 0.1% by mol or more to surely obtain the effect of the additional element.

Such a ceria-zirconia based solid solution can be produced, for example, by the following coprecipitation method. Specifically, an aqueous solution containing a cerium salt (for example, nitrate) and a zirconium salt (for example, nitrate), as well as if necessary a salt of the additional element (for example, nitrate), a surfactant, and the like is used to form a coprecipitate in the presence of ammonia. The obtained coprecipitate is isolated, recovered, and washed, followed by drying, calcination, and grinding treatments. Thus, a powdery ceria-zirconia based solid solution can be obtained. Note that the content of each raw material in the aqueous solution is adjusted as appropriate such that the obtained ceria-zirconia based solid solution contains each component in a predetermined amount.

In the method for producing a core-shell oxide material of the present invention, first, such a ceria-zirconia based solid solution is compression-molded. The pressure during the compression-molding is preferably 400 to 3500 kgf/cm$^2$ (39 to 343 MPa), and more preferably 500 to 3000 kgf/cm$^2$ (49 to 294 MPa). If the molding pressure is outside the range, the oxygen storage/release capacity tends to decrease when a core-shell oxide material to be obtained is exposed to high temperatures. Note that such a compression-molding method is not particularly limited, and a known compression-molding method such as isostatic pressing can be adopted as appropriate.

Next, the obtained compressed compact is subjected to a reduction treatment at a temperature of 1500° C. or higher (reduction treatment step). Thereby, a ceria-zirconia based solid solution having at least one ordered phase of a pyrochlore phase and a κ phase according to the present invention is formed. Such a ceria-zirconia based solid solution having the ordered phase is excellent in the heat stability on the surface, and has such a dense structure that a solid phase reaction hardly proceeds. If the reduction treatment temperature is less than the lower limit, the ordered phase has a low stability, and the oxygen storage/release capacity decreases when a core-shell oxide material to be obtained is exposed to high temperatures. Further, from the viewpoints of improving the stability of the ordered phase and surely suppressing the decrease in the oxygen storage/release capacity which may otherwise occur when a core-shell oxide material to be obtained is exposed to high temperatures, the reduction treatment temperature is preferably 1600° C. or more. Meanwhile, the reduction treatment time is preferably 0.5 hours or more, and more preferably 1 hour or more. If the reduction treatment time is less than the lower limit, the ordered phase has a low stability, and the oxygen storage/release capacity tends to decrease when a core-shell oxide material to be obtained is exposed to high temperatures. Note that the upper limits of the reduction treatment temperature and the reduction treatment time are not particularly limited, but are respectively preferably 2000° C. or lower (more preferably 1900° C. or lower) and 24 hours or less (more preferably 10 hours or less) from the viewpoints of the energy efficiency and reducing the amount of by-products.

The reduction treatment method is not particularly limited, as long as the method enables a reduction treatment at a predetermined temperature on the compressed compact in a reducing atmosphere. Examples thereof include: (i) a method in which the compressed compact is placed in a vacuum furnace whose inside is then made vacuum, a reducing gas is caused to flow in the furnace to make the atmosphere inside the furnace a reducing atmosphere, and then the reduction treatment is performed by heating at a predetermined temperature; (ii) a method in which a graphite furnace is used, the compressed compact is placed in the furnace whose inside is then made vacuum, heating is performed at a predetermined temperature to make the atmosphere inside the furnace a reducing atmosphere using reducing gases such as CO and HC generated from the furnace body, the heating fuel, and so on, and thus the reduction treatment is performed; (iii) a method in which the compressed compact is placed in a crucible filled with activated carbon, heating is performed at a predetermined temperature to make the atmosphere inside the crucible a reducing atmosphere using reducing gases such as CO and HC generated from the activated carbon and so on, and thus the reduction treatment is performed; and other similar methods.

Reducing gases used to create such a reducing atmosphere are not particularly limited, and examples of the reducing gases include CO, HC, $H_2$, other hydrocarbon gases, and the like. Moreover, among such reducing gases, a reducing gas containing no carbon (C) is preferable from the viewpoint of preventing generation of a by-product such as zirconium carbide (ZrC) in a case of performing the reduction treatment at higher temperatures. When such a reducing gas containing no carbon (C) is used, a reduction treatment is possible at a higher temperature that is approximate to the melting point of zirconium or the like. This makes it possible to more sufficiently improve the stability of the ordered phase.

In the method for producing a core-shell oxide material of the present invention, after the reduction treatment, the ceria-zirconia based solid solution having the ordered phase is preferably further subjected to an oxidation treatment. Thereby, the oxygen loss during the reduction treatment is compensated, and the stability as the oxide material tends to be improved. Such an oxidation treatment method is not particularly limited. For example, a method in which the ceria-zirconia based solid solution having the ordered phase is heated in an oxidizing atmosphere (for example, in air) can be favorably adopted. Moreover, the heating temperature in such an oxidation treatment is not particularly limited, but is preferably approximately 300 to 800° C. Further, the heating time in the oxidation treatment is not particularly limited, either, but is preferably approximately 0.5 to 5 hours.

Next, the ceria-zirconia based solid solution having the ordered phase thus obtained is subjected to grinding. Thereby, the ceria-zirconia based solid solution powder having the ordered phase is obtained. The grinding method is not particularly limited. Examples thereof include a wet grinding method, a dry grinding method, a frost shattering method, and the like.

Next, the ceria-zirconia based solid solution powder having the ordered phase thus obtained and an alumina precursor are brought into contact with each other to make the alumina precursor adhere to at least a portion of a surface of the ceria-zirconia based solid solution powder having the ordered phase (adhesion step). The alumina precursor used here is not particularly limited, as long as it forms the alumina based oxide by a heat treatment. Examples thereof include aluminium salts (for example, nitrates, acetates).

The method for bringing the ceria-zirconia based solid solution powder having the ordered phase and the alumina precursor in contact with each other is not particularly limited. Examples thereof include a method in which the ceria-zirconia based solid solution powder having the ordered phase is immersed in an aqueous solution containing the alumina precursor, and if necessary a salt of the rare earth element (for example, nitrate), a surfactant, and the like, so that the ceria-zirconia based solid solution powder having the ordered phase is impregnated with the aqueous solution of the alumina precursor. Note that the content of each raw material in the aqueous solution is adjusted as appropriate such that a core-shell oxide material to be obtained contains each component in a predetermined amount.

Next, the ceria-zirconia based solid solution powder impregnated with the aqueous solution of the alumina precursor is subjected to an evaporation to dryness. Then, the ceria-zirconia based solid solution powder with the alumina precursor adhering thereto is subjected to a heat treatment (calcination treatment). Thereby, a shell is formed which comprises an alumina based oxide on at least a portion of a surface of a core which comprises the ceria-zirconia based solid solution powder having the ordered phase. Thus, the core-shell oxide material of the present invention is obtained.

The heat treatment temperature is preferably 300 to 1100° C., and more preferably 500 to 900° C. If the heat treatment temperature is less than the lower limit, a stable shell is hardly formed as a trend. Meanwhile, if the heat treatment temperature exceeds the upper limit, the obtained core-shell oxide material tends to have a small specific surface area. Moreover, the heating time is not particularly limited, but is preferably 2 to 10 hours.

In the method for producing a core-shell oxide material of the present invention, the amount of the alumina based oxide coating attained by a single operation (the adhesion step and the calcination step) is preferably 0.1 to 6 parts by mass, and more preferably 0.5 to 2 parts by mass, relative to 100 parts by mass of the core. If the amount of the alumina based oxide coating attained by the single operation is less than the lower limit, the number of the adhesion step and the calcination step repeated is increased, which is disadvantageous in terms of production cost. Meanwhile, if the amount of the alumina based oxide coating attained by the single operation exceeds the upper limit, the unevenness of the coating and the composition is likely to occur. Thus, in a case where a total amount of the alumina based oxide coating is to be increased, the operation (the adhesion step and the calcination step) is preferably repeated several times (preferably 2 or 3 times) in such a manner that the amount of the alumina based oxide coating per operation is within the above-described range.

Next, a catalyst for purification of exhaust gas of the present invention will be described. The catalyst for purification of exhaust gas of the present invention comprises:

the core-shell oxide material of the present invention; and a noble metal in contact with the core-shell oxide material. Such a catalyst for purification of exhaust gas of the present invention has an excellent oxygen storage/release capacity (OSC) (particularly, oxygen storage/release rate (OSC-r)) and exhibits an excellent NOx purification performance even when the catalyst is exposed to high temperatures.

In the catalyst for purification of exhaust gas of the present invention, the noble metal is preferably Rh, Pd, or Pt, more preferably Rh or Pd, and particularly preferably Rh, from the viewpoint that an excellent NOx purification performance is obtained. In the catalyst for purification of exhaust gas of the present invention, the form of such a noble metal is not particularly limited, as long as the noble metal is in contact with the core-shell oxide material. The noble metal may be directly supported on and in contact with the surface of the core-shell oxide material. From the viewpoint that the operation is simple, the core-shell oxide material may be mixed with another oxide material supporting the noble metal to bring the noble metal into contact with the core-shell oxide material.

The catalyst for purification of exhaust gas of the present invention in a pellet shape may be used after a reaction tube or the like is filled therewith. Nevertheless, from the viewpoint of practicability, it is preferable to use a honeycomb catalyst in which a layer of the catalyst for purification of exhaust gas of the present invention and a catalyst layer containing alumina are formed on inner walls of pores of a honeycomb substrate. Moreover, among such honeycomb catalysts, from the viewpoints of having an excellent oxygen storage/release capacity and exhibiting an excellent NOx purification performance even in the event of exposures to high temperatures and high-speed gases, preferable is a honeycomb catalyst comprising a lower catalyst layer containing the noble metal and alumina formed on inner walls of pores of a honeycomb substrate, and an upper catalyst layer of the catalyst for purification of exhaust gas of the present invention formed on the lower catalyst layer; and more preferable is a honeycomb catalyst comprising the upper catalyst layer constituted of a mixture of the core-shell oxide material of the present invention with zirconia supporting the noble metal.

EXAMPLES

Hereinafter, the present invention will be described more specifically on the basis of Examples and Comparative Examples. However, the present invention is not limited to the following Examples. Note that a ceria-zirconia-praseodymium composite oxide powder used in Examples and Comparative Examples was prepared according to the following method.

Preparation Example 1

A ceria-zirconia based solid solution powder in which the content ratio among cerium, zirconium, and praseodymium was 45:54:1 in terms of moles ([cerium]:[zirconium]:[praseodymium]) was prepared as follows. Specifically, first, 442 g of an aqueous solution containing cerium nitrate in an amount of 28% by mass in terms of $CeO_2$, 590 g of an aqueous solution containing zirconium oxynitrate in an amount of 18% by mass in terms of $ZrO_2$, 100 g of an aqueous solution containing praseodymium nitrate in an amount of 1.2 g in terms of $Pr_6O_{11}$, and 197 g of hydrogen peroxide water containing hydrogen peroxide in an amount 1.1 times the molar amount of cerium to be contained were added to 1217 g of an aqueous solution containing ammonia in an amount 1.2 times the neutralization equivalent, so that a coprecipitate was formed. The obtained coprecipitate was centrifuged, and washed with ion-exchange water. Next, the obtained coprecipitate was dried at 110° C. for 10 hours or more, and then calcined in air at 400° C. for 5 hours. Thereby, a solid solution of cerium, zirconium, and praseodymium ($CeO_2$—$ZrO_2$—$Pr_6O_{11}$ solid solution) was obtained. Subsequently, the solid solution was ground using a grinder ("Wonder Blender" manufactured by AS ONE Corporation) and was sieved such that the particle diameters were 75 μm or less. Thus, the ceria-zirconia-praseodymium solid solution powder was obtained.

Next, 20 g of the ceria-zirconia-praseodymium solid solution powder was packed in a polyethylene bag (capacity: 0.05 L) whose inside was then deaerated. After that, the mouth of the bag was sealed by heating. Thereafter, using an isostatic press ("CK4-22-60" manufactured by NIKKISO CO., LTD.), the bag was molded by isostatic pressing (CIP) at a pressure (molding pressure) of 2000 kgf/cm² (196 MPa) for 1 minute. Thus, a compact of the ceria-zirconia-praseodymium solid solution powder was obtained. The size of the compact was a length of 4 cm, a width of 4 cm, and an average thickness of 7 mm, and the mass was approximately 20 g.

Subsequently, the obtained compacts (two sheets) were placed in a crucible (internal volume: a diameter of 8 cm and a height of 7 cm) filled with 70 g of activated carbon, which was then covered with a lid. After that, the crucible was put in a high speed heating electric furnace, and the temperature was raised to 1000° C. over 1 hour and further raised to 1700° C. over 4 hours. Then, the resultant was heated at 1700° C. (reduction treatment temperature) for 5 hours, followed by cooling to 1000° C. over 4 hours. Thereafter, the temperature was naturally lowered to room temperature. Thus, a reduction-calcination product was obtained.

Next, the reduction-calcination product was oxidized by heating in air under a temperature condition of 500° C. for 5 hours to obtain a ceria-zirconia-praseodymium composite oxide in which the content ratio among cerium, zirconium, and praseodymium was 45:54:1 in terms of moles ([cerium]: [zirconium]:[praseodymium]) in the composite oxide. The ceria-zirconia-praseodymium composite oxide was ground and sieved such that the particle diameters were 75 μm or less. Thus, a ceria-zirconia-praseodymium composite oxide powder (hereinafter abbreviated as "CZP powder") was obtained.

Comparative Preparation Example 1

A ceria-zirconia based solid solution powder in which the content ratio between cerium and zirconium was 45.5:54.5 in terms of moles ([cerium]:[zirconium]) was prepared as follows. Specifically, first, 442 g of an aqueous solution containing cerium nitrate in an amount of 28% by mass in terms of $CeO_2$, 590 g of an aqueous solution containing zirconium oxynitrate in an amount of 18% by mass in terms of $ZrO_2$, and 197 g of hydrogen peroxide water containing hydrogen peroxide in an amount 1.1 times the molar amount of cerium to be contained were added to 1217 g of an aqueous solution containing ammonia in an amount 1.2 times the neutralization equivalent, so that a coprecipitate was formed. The obtained coprecipitate was centrifuged, and washed with ion-exchange water. Next, the obtained coprecipitate was dried at 110° C. for 10 hours or more, and then calcined in air at 400° C. for 5 hours. Thereby, a solid solution of cerium and zirconium ($CeO_2$—$ZrO_2$ solid solution) was obtained. Subsequently, the solid solution was ground using a grinder ("Wonder Blender" manufactured by AS ONE Corporation) and was sieved such that the particle diameters were 75 μm or less, followed by grinding using the grinder such that the 50% distribution particle diameter was D50=10 μm. Thus, the ceria-zirconia composite oxide powder (hereinafter abbreviated as "CZ powder") was obtained.

Example A1

An aqueous solution of a La-containing alumina precursor was prepared by dissolving 9.5 mmol of aluminium nitrate and 0.096 mmol of lanthanum nitrate in 200 ml of ion-exchange water. To the aqueous solution of the La-containing alumina precursor, 100 g of the CZP powder obtained in Preparation Example 1 was added and stirred for 15 minutes. The obtained dispersion containing the CZP powder was evaporated to dryness by heating at 200° C. with stirring. The resulting dried product was calcined at 900° C. for 5 hours. The obtained calcination product was ground and sieved such that the particle diameters were 75 μm or less. Thus, a core-shell oxide material powder in which the surface of the CZP powder was coated with an alumina layer containing lanthanum was obtained (the CZP amount: 100 parts by mass, the amount of the alumina coating: 0.5 parts by mass, the amount of the lanthana coating: 0.015 parts by mass).

Example A2

In the same manner as in Example A1, a core-shell oxide material powder in which the surface of the CZP powder was coated with the alumina layer containing lanthanum was prepared (the CZP amount: 100 parts by mass, the amount of the alumina coating: 0.5 parts by mass, the amount of the lanthana coating: 0.015 parts by mass). Next, in the same manner as in Example A1 except that 100 g of this core-shell oxide material powder was used in place of the CZP powder, a core-shell oxide material powder in which the surface of the CZP powder was coated with an alumina layer containing lanthanum was obtained (the CZP amount: 100 parts by mass, the amount of the alumina coating: 1.0 parts by mass, the amount of the lanthana coating: 0.03 parts by mass).

Example A3

In the same manner as in Example A1 except that an aqueous solution of a La-containing alumina precursor prepared by dissolving 19.0 mmol of aluminium nitrate and 0.192 mmol of lanthanum nitrate in 200 ml of ion-exchange water was used, a core-shell oxide material powder in which the surface of the CZP powder was coated with an alumina layer containing lanthanum was obtained (the CZP amount: 100 parts by mass, the amount of the alumina coating: 1.0 parts by mass, the amount of the lanthana coating: 0.03 parts by mass). Next, in the same manner as in Example A1 except that 100 g of this core-shell oxide material powder was used in place of the CZP powder, and that an aqueous solution of a La-containing alumina precursor prepared by dissolving 19.0 mmol of aluminium nitrate and 0.192 mmol of lanthanum nitrate in 200 ml of ion-exchange water was used, a core-shell oxide material powder in which the surface of the CZP powder was coated with an alumina layer containing lanthanum was obtained (the CZP amount: 100 parts by mass, the amount of the alumina coating: 2.0 parts by mass, the amount of the lanthana coating: 0.06 parts by mass).

Example A4

An aqueous solution of an alumina precursor was prepared by dissolving 9.5 mmol of aluminium nitrate in 200 ml of ion-exchange water. In the same manner as in Example A1 except that this aqueous solution of the alumina precursor was used in place of the aqueous solution of the La-containing alumina precursor, a core-shell oxide material powder in which the surface of the CZP powder was coated with an alumina layer was obtained (the CZP amount: 100 parts by mass, the amount of the alumina coating: 0.5 parts by mass).

Comparative Example A1

The CZP powder obtained in Preparation Example 1 was calcined at 900° C. for 5 hours. The obtained calcination product was ground and sieved such that the particle diameters were 75 μm or less. Thus, a CZP powder whose surface was not coated was obtained.

Comparative Example A2

To 100 parts by mass of the CZP powder obtained in Preparation Example 1, 1 part by mass of an alumina powder containing 1% by mass of La ("TH 100" manufactured by Sasol Limited) was added and mixed together using a mortar for 30 minutes or more, followed by calcination at 900° C. for 5 hours. The obtained calcination product was ground and sieved such that the particle diameters were 75 μm or less. Thus, a mixture powder of the CZP powder with the La-containing alumina powder was obtained.

Comparative Example A3

In the same manner as in Example A1 except that 100 g of the CZ powder obtained in Comparative Preparation Example 1 was used in place of the CZP powder, a core-shell oxide material powder in which the surface of the CZ powder was coated with an alumina layer containing lanthanum was prepared (the CZ amount: 100 parts by mass, the amount of the alumina coating: 0.5 parts by mass, the amount of the lanthana coating: 0.015 parts by mass). Next, in the same manner as in Example A1 except that 100 g of this core-shell oxide material powder was used in place of the CZP powder, a core-shell oxide material powder in which the surface of the CZ powder was coated with an alumina layer containing lanthanum was obtained (the CZ amount: 100 parts by mass, the amount of the alumina coating: 1.0 parts by mass, the amount of the lanthana coating: 0.03 parts by mass).

<X-Ray Diffraction (XRD) Measurement>

Figure 1:
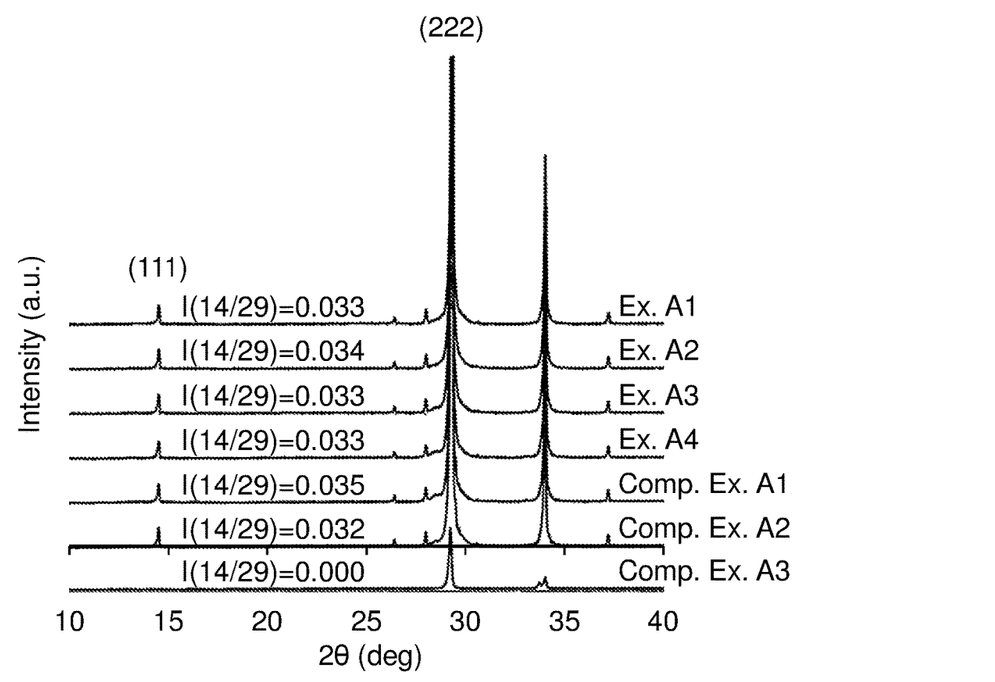
FIG. 1 is a graph showing X-ray diffraction patterns of oxide powders obtained in Examples A1 to A4 and Comparative Examples A1 to A3.

Each of the oxide powders obtained in Examples and Comparative Examples was heated in air at 1100° C. for 5 hours. After the heating, an X-ray diffraction pattern of an ordered phase of each oxide powder (an ordered phase of the core) was measured by X-ray diffractometry with an X-ray diffraction apparatus ("RINT-2100" manufactured by Rigaku Corporation) using CuKα as an X-ray source. FIG. 1 shows the results. In addition, from the obtained X-ray diffraction pattern, an intensity ratio of a diffraction line at 2θ=14.5° to a diffraction line at 2θ=29° [I(14/29) value] and an intensity ratio of a diffraction line at 2θ=28.5° to the diffraction line at 2θ=29° [I(28/29) value] were calculated. Table 1 shows the results.

<Catalyst Preparation>

Each of the oxide powders obtained in Examples and Comparative Examples was mixed with a Rh-supporting $Al_2O_3$—$ZrO_2$—$La_2O_3$—$Nd_2O_3$ composite oxide powder (the amount of Rh supported: 0.2% by mass, $Al_2O_3$:$ZrO_2$: $La_2O_3$:$Nd_2O_3$=30% by mass:64% by mass:4% by mass:2% by mass, average particle diameter: 20 μm) at a mass ratio of 1:1 using a mortar. The obtained mixture was compression-molded at a hydrostatic pressure of 1 t. The obtained compact was ground and sorted such that the particle diameters were 0.5 to 1 mm. Thus, a pellet catalyst was obtained.

<High-Temperature Durability Test>

A cylindrical reaction tube having a diameter of 10 mm was filled with 1.5 g of the obtained pellet catalyst. A rich gas [$H_2$ (2%)+$CO_2$ (10%)+$N_2$ (88%)] and a lean gas [$O_2$ (1%)+$CO_2$ (10%)+$N_2$ (89%)] were passed alternately through the pellet catalyst under a temperature condition of 1100° C. at a gas flow rate of 10 L/minute, while being switched from one to the other every 5 minutes and for 5 hours in total.

<Measurements of Oxygen Storage/Release Rate (OSC-r) and Oxygen Storage/Release Capacity (OSC) (1)>

A reaction tube was filled with a mixture of 0.25 g of each pellet catalyst after the high-temperature durability test with 0.25 g of silica sand. A rich gas [CO (2% by volume)+$N_2$ (the balance)] was passed through the catalyst with a catalyst entry gas temperature of 500° C. at a gas flow rate of 10 L/minute for 3 minutes. Then, the flow gas was switched to a lean gas [$O_2$ (1% by volume)+$N_2$ (the balance)] and passed for 3 minutes. Thereafter, the flow gas was switched again to the rich gas. From a $CO_2$ amounts in a catalyst exit gas for 5 seconds and for 3 minutes after the second flow gas switch, an oxygen storage/release rate (OSC-r, unit: μmol/(g·s)) and an oxygen storage/release capacity (OSC, unit: μmol/g) were calculated, respectively. Table 1 shows the results.

<50% NOx Purification Temperature Measurement (1)>

A reaction tube was filled with 0.5 g of each pellet catalyst after the high-temperature durability test. Nevertheless, regarding the pellet catalyst using the mixture powder obtained in Comparative Example A2, a reaction tube was filled with a mixture of 0.25 g of this pellet catalyst with 0.25 g of silica sand. A model gas [NO (1200 volume ppm)+$CO_2$ (10% by volume)+$O_2$ (0.646% by volume)+CO (0.7% by volume)+$C_3H_6$ (1600 volume ppmC)+$H_2$ (0.233% by volume)+$H_2O$ (10% by volume)+$N_2$ (the balance)] was passed through the catalyst at a gas flow rate of 10000 L/minute, while being heated from 100° C. to 600° C. at a rate of temperature rise of 50° C./minute. At each catalyst entry gas temperature, NO concentrations in a catalyst entry gas and a catalyst exit gas were measured to calculate a NOx purification ratio. Then, a catalyst temperature (50% NOx purification temperature) at which 50% of NOx was purified was determined. Table 1 shows the results.

<Transient NOx Purification Ratio Measurement>

A reaction tube was filled with 0.5 g of each pellet catalyst after the high-temperature durability test. Nevertheless, regarding the pellet catalyst using the mixture powder obtained in Comparative Example A2, a reaction tube was filled with a mixture of 0.25 g of this pellet catalyst with 0.25 g of silica sand. A lean gas [NO (1500 volume ppm)+$CO_2$ (10% by volume)+$O_2$ (0.8% by volume)+CO (0.65% by volume)+$C_3H_6$ (3000 volume ppmC)+$H_2O$ (5% by volume)+$N_2$ (the balance)] was passed through the catalyst at a catalyst entry gas temperature of 500° C. and a gas flow rate of 10 L/minute for 1 hour. Then, the flow gas was switched to a rich gas [NO (1500 volume ppm)+$CO_2$ (10% by volume)+CO (0.65% by volume)+$C_3H_6$ (3000 volume ppmC)+$H_2O$ (5% by volume)+$N_2$ (the balance)]. Average NO concentrations in a catalyst entry gas and in a catalyst exit gas for 5 minutes after the flow gas switch were measured, and a transient NOx purification ratio was determined. Table 1 shows the results.

TABLE 1

| | Oxide material powder | | I (14/29) value | I (28/29) value | OSC (μmol/g) | OSC-r (μmol/(g · s)) | 50% NOx purification temperature (° C.) | Transient NOx purification ratio (%) |
|---|---|---|---|---|---|---|---|---|
| | Core | Shell | | | | | | |
| Ex. A1 | CZP powder (100 parts by mass) | La-containing alumina (0.5 parts by mass) | 0.033 | ≤0.026 | 373 | 24 | 301 | 92 |

TABLE 1-continued

| | Oxide material powder | | I (14/29) | I (28/29) | OSC | OSC-r | 50% NOx purification temperature | Transient NOx purification ratio |
|---|---|---|---|---|---|---|---|---|
| | Core | Shell | value | value | (µmol/g) | (µmol/(g · s)) | (° C.) | (%) |
| Ex. A2 | CZP powder (100 parts by mass) | La-containing alumina (1 parts by mass) | 0.034 | ≤0.026 | 399 | 25 | 299 | 94 |
| Ex. A3 | CZP powder (100 parts by mass) | La-containing alumina (2 parts by mass) | 0.033 | ≤0.026 | 350 | 23 | 299 | 93 |
| Ex. A4 | CZP powder (100 parts by mass) | Alumina (0.5 parts by mass) | 0.033 | ≤0.026 | 371 | 24 | 304 | 91 |
| Comp. Ex. A1 | CZP powder | — | 0.035 | ≤0.026 | 368 | 23 | 313 | 89 |
| Comp. Ex. A2 | Mixture powder (CZP powder + La-containing alumina powder) | | 0.032 | ≤0.026 | 360 | 22 | 310 | 89 |
| Comp. Ex. A3 | CZP powder (100 parts by mass) | La-containing alumina (1 parts by mass) | 0.000 | — | 343 | 20 | 311 | 87 |

As is apparent from the results shown in Table 1, the core-shell oxide material powders obtained in Examples A1 to A4, the CZP powder obtained in Comparative Example A1, and the mixture powder obtained in Comparative Example A2 all had diffraction line intensity ratios [I(14/29) values] of 0.02 or more in the X-ray diffraction patterns using CuKα as the X-ray source, verifying that that these powders had at least one ordered phase of a pyrochlore phase and a κ phase. On the other hand, the core-shell oxide material powder obtained in Comparative Example A3 had no diffraction line at 2θ=14.5° observed in the X-ray diffraction pattern using CuKα as the X-ray source (I(14/29) =0). It was found that neither a pyrochlore phase nor a κ phase was formed.

Moreover, the pellet catalysts using the core-shell oxide material powders obtained in Examples A1 to A4, the pellet catalyst using the CZP powder obtained in Comparative Example A1, and the pellet catalyst using the mixture powder obtained in Comparative Example A2 all had excellent oxygen storage/release capacities (OSC) and oxygen storage/release rates (OSC-r). Especially, the pellet catalysts using the core-shell oxide material powders in which the amounts of the alumina coatings were 0.5 to 1 part by mass relative to 100 parts by mass of the CZP powders or the CZ powder (Examples A1, A2 and A4) had particularly excellent oxygen storage/release capacities (OSC) and oxygen storage/release rates (OSC-r). On the other hand, the pellet catalyst using the core-shell oxide material powder in which neither a pyrochlore phase nor a κ phase was formed (Comparative Examples A3) had poor oxygen storage/release capacity (OSC) and oxygen storage/release rate (OSC-r).

Further, it was found that the pellet catalysts using the core-shell oxide material powders obtained in Examples A1 to A4 had low 50% NOx purification temperatures, excellent NOx purification activities at low temperatures, and high transient NOx purification ratios, and were capable of quickly responding to a change in the composition of the flow gas, in comparison with the catalyst using the CZP powder obtained in Comparative Example A1, the catalyst using the mixture powder obtained in Comparative Example A2, and the catalyst using the core-shell oxide material powder obtained in Comparative Examples A3 in which neither a pyrochlore phase nor a κ phase was formed.

Example B1

An $Al_2O_3$—$CeO_2$—$ZrO_2$—$La_2O_3$ composite oxide powder ($Al_2O_3$:$CeO_2$:$ZrO_2$:$La_2O_3$=30% by mass:20% by mass: 45% by mass:5% by mass, average particle diameter: 20 µm, hereinafter abbreviated as "ACZL powder") was immersed in an aqueous solution of palladium nitrate containing 8.8% by mass of Pd (manufactured by Cataler Corporation). The ACZL powder was impregnated with palladium nitrate. Then, the ACZL powder impregnated with palladium nitrate was heated at 500° C. for 3 hours. Thus, a Pd-supporting ACZL powder was obtained.

Next, the Pd-supporting ACZL powder, a 1%-by-mass $La_2O_3$-composite $Al_2O_3$ powder (average particle diameter: 20 µm, hereinafter abbreviated as "LA powder"), and an $Al_2O_3$-based binder were added to distilled water with stirring to prepare a Pd-containing slurry. Note that contents of the materials in the Pd-containing slurry were adjusted such that coating amounts of the materials were to be Pd: 0.69 g/L, the ACZL powder: 45 g/L, and the LA powder: 40 g/L, per liter of the capacity of the substrate. The obtained Pd-containing slurry was poured into a cordierite honeycomb substrate (manufactured by DENSO CORPORATION) having a capacity of 875 cc (600H/3-9R-08). An extra portion of the slurry was blown off with a blower, and inner walls of pores of the cordierite honeycomb substrate were coated with the Pd-containing slurry. Then, the honeycomb substrate was heated with a dryer at 120° C. for 2 hours to remove water. Further, the resultant was calcined using an electric furnace at 500° C. for 2 hours. Thereby, a Pd-supporting catalyst layer was formed on the inner walls of the pores of the cordierite honeycomb substrate.

Moreover, an $Al_2O_3$—$ZrO_2$—$La_2O_3$ composite oxide powder ($Al_2O_3$:$ZrO_2$:$La_2O_3$=30% by mass:65% by mass: 5% by mass, average particle diameter: 20 µm, hereinafter abbreviated as "AZL powder") was immersed in an aqueous solution of rhodium nitrate containing 2.75% by mass of Rh (manufactured by Cataler Corporation). The AZL powder was impregnated with rhodium nitrate. Then, the AZL powder impregnated with rhodium nitrate was heated at 500° C. for 3 hours. Thus, a Rh-supporting AZL powder was obtained.

Next, the Rh-supporting AZL powder, the LA powder, the ACZL powder, the core-shell oxide material powder obtained in Example A2 (the amount of the alumina coating:

1.0% by mass, the amount of the lanthana coating: 0.03% by mass), and an $Al_2O_3$-based binder were added to distilled water with stirring to prepare a Rh-containing slurry. Note that contents of the materials in the Rh-containing slurry were adjusted such that coating amounts of the materials were to be Rh: 0.10 g/L, the AZL powder: 35 g/L, the LA powder: 28 g/L, the ACZL powder: 72 g/L, and the core-shell oxide material powder: 20 g/L, per liter of the capacity of the substrate. The obtained Rh-containing slurry was poured into the cordierite honeycomb substrate with the Pd-supporting catalyst layer. An extra portion of the slurry was blown off with a blower, and the Pd-supporting catalyst layer was coated with the Rh-containing slurry. Then, the honeycomb substrate was heated with a dryer at 120° C. for 2 hours to remove water. Further, the resultant was calcined using an electric furnace at 500° C. for 2 hours. Thereby, a Rh-supporting catalyst layer was formed on the Pd-supporting catalyst layer. Thus, a honeycomb catalyst was obtained which comprised: the Pd-supporting catalyst layer (lower layer) on the inner walls of the pores of the cordierite honeycomb substrate; and the Rh-supporting catalyst layer (upper layer) thereon.

Comparative Example B1

In the same manner as in Example B1, except that the CPZ powder obtained in Comparative Example A1 was used in place of the core-shell oxide material powder obtained in Example A2, a honeycomb catalyst was obtained which comprised: the Pd-supporting supporting catalyst layer (lower layer) on inner walls of pores of a cordierite honeycomb substrate; and a Rh-supporting catalyst layer (upper layer) thereon.

<On-Machine High-Temperature Durability Test>

Using a gasoline engine "1UR-FE" (manufactured by Toyota Motor Corporation), an accelerated deterioration test was conducted on each of the honeycomb catalysts at 1000° C. (catalyst bed temperature) for 25 hours. Specifically, by adjusting a throttle opening angle and an engine load, a rich atmosphere, a stoichiometric atmosphere, and a lean atmosphere were repeated in a constant cycle to change the composition of exhaust gas and to accelerate the deterioration of the honeycomb catalysts.

<20% NOx Purification Temperature Measurement (2)>

20% NOx purification temperatures was determined in the same manner as in <50% NOx Purification Temperature Measurement (1)>described above, except that the honeycomb catalyst after the on-machine high-temperature durability test was used in place of the reaction tube filled with the pellet catalyst after the high-temperature durability test, and that catalyst temperature at which 20% of NOx was purified was determined. Table 2 shows the results.

<Maximum Oxygen Storage Capacity (OSC) Measurement>

Using a gasoline engine "2AZ—FE" (manufactured by Toyota Motor Corporation), the maximum oxygen storage capacity (OSC) of the honeycomb catalyst after the on-machine high-temperature durability test was measured. Specifically, an air-fuel ratio (A/F) was feedback-controlled aiming at an A/F value of 14.1 or 15.1. A maximum oxygen storage capacity OSC was calculated according to the following expression from a difference (ΔA/F) between the air-fuel ratio at the stoichiometric point (theoretical air-fuel ratio) and an A/F sensor output. Table 2 shows the results. OSC [g]=0.23×ΔA/F×Fuel Injection Amount.

TABLE 2

| Oxide material powder | | OSCmax (g) | 20% NOx purification temperature (° C.) |
|---|---|---|---|
| Core | Shell | | |
| Ex. B1 CZP powder | La-containing alumina (1 parts by mass) | 0.26 | 341 |
| Comp. Ex. B1 CZP powder | — | 0.27 | 347 |

As is apparent from the results shown in Table 2, both of the honeycomb catalyst (Example B1) using the core-shell oxide material powder obtained in Example A2 and the honeycomb catalyst (Comparative Example B1) using the CZP powder obtained in Comparative Example A1 had excellent maximum oxygen storage capacities (OSC). Nevertheless, it was found that the honeycomb catalyst (Example B1) using the core-shell oxide material powder obtained in Example A2 had a low 20% NOx purification temperature and an excellent NOx purification activity at low temperatures, in comparison with the honeycomb catalyst (Comparative Example B1) using the CZP powder obtained in Comparative Example A1.

As has been described above, the use of the core-shell oxide material of the present invention makes it possible to obtain a catalyst for purification of exhaust gas which has an excellent oxygen storage/release capacity (OSC) (particularly, oxygen storage/release rate (OSC-r)) and exhibits an excellent NOx purification performance even when the catalyst is exposed to high temperatures.

Thus, the core-shell oxide material of the present invention is useful as a support, a co-catalyst, and the like of a catalyst for purification of exhaust gas to purify exhaust gas containing a nitrogen compound emitted from an internal combustion engine of an automobile or other similar sources.

What is claimed is:
1. A core-shell oxide material, comprising:
   a core which comprises a ceria-zirconia based solid solution powder having at least one ordered phase of a pyrochlore phase and a κ phase; and
   a shell which comprises an alumina based oxide disposed on at least a portion of a surface of the core.
2. The core-shell oxide material according to claim 1, wherein an intensity ratio of a diffraction line at 2θ=14.5° to a diffraction line at 2θ=29° [I(14/29) value] is 0.02 or more, which is calculated from an X-ray diffraction pattern obtained by an X-ray diffraction measurement using CuKα after the core-shell oxide material is heated in air at 1100° C. for 5 hours.
3. The core-shell oxide material according to claim 1, wherein the core further comprises a rare earth element other than Ce.
4. The core-shell oxide material according to claim 1, wherein the shell further comprises a rare earth element.
5. The core-shell oxide material according to claim 1, wherein the amount of the alumina based oxide coating is 0.1 to 6 parts by mass relative to 100 parts by mass of the core.
6. A method for producing a core-shell oxide material, comprising the steps of:
   subjecting a compact obtained by compression-molding a ceria-zirconia based solid solution to a reduction treatment at a temperature of 1500° C. or higher and then grinding to obtain a ceria-zirconia based solid solution powder having at least one ordered phase of a pyrochlore phase and a κ phase;

bringing an alumina precursor into contact with the ceria-zirconia based solid solution powder having the ordered phase to make the alumina precursor adhere to at least a portion of a surface of the ceria-zirconia based solid solution powder having the ordered phase; and heating the ceria-zirconia based solid solution powder with the alumina precursor adhering thereto to obtain the core-shell oxide material according to claim 1.

7. A catalyst for purification of exhaust gas, comprising:
the core-shell oxide material according to claim 1; and
a noble metal in contact with the core-shell oxide material.

8. A method for purification of exhaust gas, comprising bringing exhaust gas containing nitrogen oxide into contact with the catalyst for purification of exhaust gas according to claim 7.

\* \* \* \* \*